Jan. 7, 1947. W. MAKY 2,413,878
ELBOW PIPE COUPLING
Filed July 6, 1944
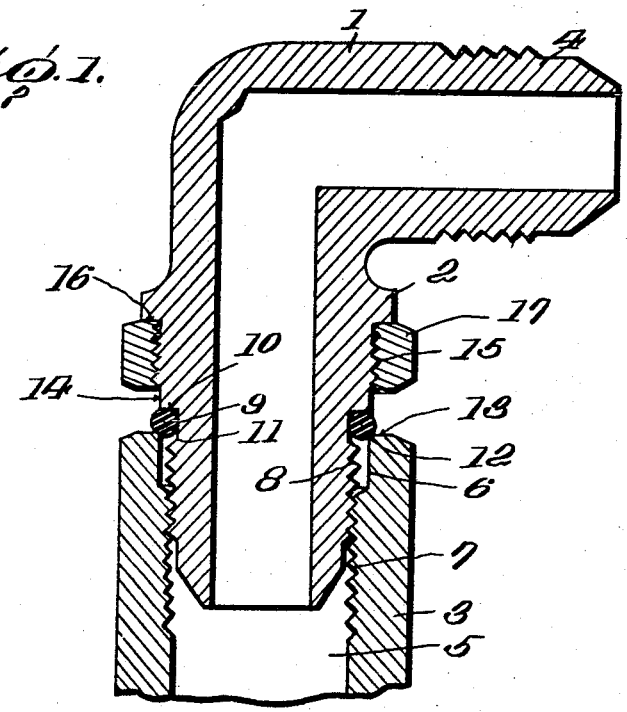
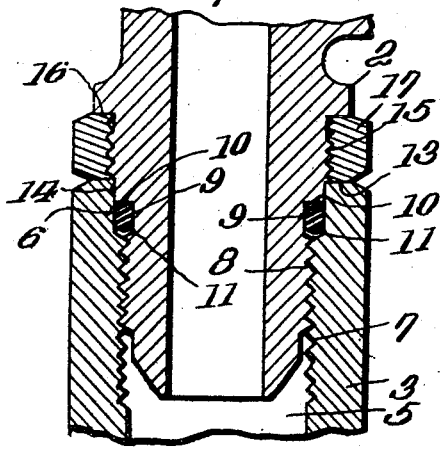
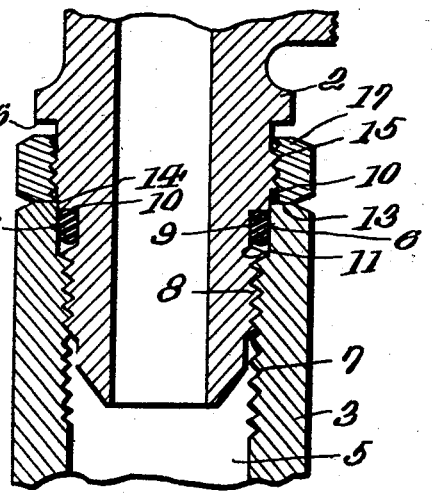
Inventor
Walter Maky
By Mason, Porter & Diller
Attorneys Patented Jan. 7, 1947

2,413,878

UNITED STATES PATENT OFFICE 2,413,878

ELBOW PIPE COUPLING

Walter Maky, Cleveland, Ohio, assignor to The Parker Appliance Company, Cleveland, Ohio, a corporation of Ohio Application July 6, 1944, Serial No. 543,617

4 Claims. (Cl. 285—55)

1

The invention relates to new and useful improvements in a coupling for securing an elbow pipe to a fixed part in different set angular positions relative thereto.

An object of the invention is to provide a coupling of the above type with a sealing chamber for housing a ring gasket which is defined by a smooth wall on the pipe, a smooth wall on the boss and a smooth wall extending from the pipe to the boss for closing said sealing chamber at each set angular position of the elbow pipe.

A further object of the invention is to provide a coupling of the above type wherein the sealing chamber is so dimensioned relative to the gasket that the gasket makes sealing contact solely with the smooth wall on the pipe and the smooth wall on the boss which is opposed thereto.

A further object of the invention is to provide a coupling of the above type wherein the smooth wall for closing the sealing chamber is formed integral with the pipe and wherein the pipe at the outer edge of said smooth wall is shaped and dimensioned so as to telescope into the boss and make sliding contact therewith.

A still further object of the invention is to provide an elbow pipe coupling having a lock nut with a stop shoulder against which the nut may be engaged and utilized for limiting the extent to which the elbow pipe may be threaded into the boss, and wherein said nut may also be utilized when the elbow pipe is backed off to a desired set position for locking said elbow in said set position.

These and other objects will in part be obvious and in part will hereinafter be more fully disclosed.

In the drawing which shows by way of illustration one embodiment of the invention Figure 1 is a longitudinal sectional view through the improved coupling for securing an elbow pipe to a boss on a fixed member, the parts being positioned for the entrance of the ring gasket into the sealing chamber.

Figure 2 is a view similar to Figure 1 showing the nut pressed against the shoulder on the elbow pipe and utilized as a stop means for limiting the extent to which the elbow pipe is threaded into the boss.

Figure 3 is a view similar to Figure 2 but showing the elbow pipe as having been turned to a desired set position by a partial unthreading movement of the pipe in the boss and secured in said set position by the lock nut.

The invention is particularly adapted for joining an elbow pipe to a boss on a fixed part such

2 as a tank or the like. The elbow pipe 1 has a portion 2 which is adapted to be connected to the boss 3. Said elbow pipe has a right angle portion 4 which is to be set at a desired angle to the fixed boss 3.

The boss 3 has a bore 5 therethrough leading to the tank. Said boss is counterbored at its outer end so as to provide a smooth wall 6 which is to serve as the outer wall of a sealing chamber for a ring gasket. A section of the wall of the bore of the boss from the smooth wall 6 inwardly is threaded as indicated at 7. The portion 2 of the elbow pipe has a threaded section 8 which is adapted to engage the threaded section of the boss. The portion 2 of the elbow pipe is shaped so as to provide a smooth wall 9 which is opposed to the smooth wall 6 on the boss. This wall 9 forms the inner wall of the sealing chamber.

As shown in the present embodiment of the invention, the portion 2 of the elbow pipe is provided with a smooth wall 10 which is disposed in a plane at right angles to the wall 9. This wall 10 forms the closing wall of the sealing chamber. Disposed within this sealing chamber is a ring gasket 11. The ring gasket is of slightly less diameter than the diameter of the smooth portion 9 so that it will contact therewith when it is expanded and placed over the threads and then released for engagement with said smooth wall 9.

The ring gasket is dimensioned relative to the width of the sealing chamber, that is the distance between the smooth walls 6 and 9, so that it is slightly greater in diameter than the diameter of the smooth wall surface 6. The corner 12 between the smooth cylindrical surface 6 and the smooth surface 13 at the outer end of the boss is burnished or rounded slightly.

The gasket is placed on the portion 2 of the elbow pipe and then the portion 2 is threaded into the boss. The gasket is dimensioned so that when it contacts with this rounded shoulder 12 it will be deformed and forced into the sealing chamber. This deforming of the gasket changes it to more or less of an elliptical shape and the gasket will therefore make sealing contact with the smooth walls 6 and 9 by the inherent resilience of the gasket.

The length of the sealing chamber, that is the distance between the smooth wall 10 and the threaded section, is of greater dimension than the major diameter of the gasket after it is placed in the sealing chamber so that the seal between the gasket and the parts is brought about solely by the expansion of the gasket. Any fluid leaking past the threaded connection between the elbow pipe and the boss and bearing on the gasket will increase the tightness of the seal. An above noted the closing wall 10 of the sealing chamber is smooth and at right angles to the side walls of the recess in which the gasket is positioned and therefore any deformation of the gasket by fluid pressure will be resisted by the gasket contacting with this smooth flat surface. This will increase the tightness of the seal through the tendency of the gasket under such force to expand laterally.

The elbow pipe has a smooth cylindrical portion 14, a threaded section 15, and a shoulder section 16. A lock nut 17 engages the threaded section 15 and is adapted to contact with the shoulder 16 for purposes hereinafter stated. The cylindrical section 14 is so dimensioned that it makes sliding telescoping contact with the smooth wall 6 of the boss. Therefore the wall 10 which closes the sealing chamber extends all the way from the wall 6 to the wall 9 and there is no possible chance of the gasket being extruded so as to project between the nut and the boss. As illustrated, the nut does not make contact at any time with the gasket.

In the assembling of the parts, the nut is placed against the shoulder 16 and then the portion 2 of the elbow pipe is threaded into the boss until the nut contacts with the end of the boss. This limits the extent to which the portion 2 of the elbow pipe can be threaded into the boss and it insures that there shall be ample threaded connection so that the elbow pipe may be turned or backed off for the setting of the elbow pipe in any desired position relative to the boss. The length of the smooth cylindrical surface 14 is such that when the elbow pipe is turned to any angle within 360° for the setting of the same, said smooth surface will still be within the boss and the sealing chamber will be closed.

In Figure 2 the lock nut is shown against the shoulder and the portion 2 of the elbow pipe threaded into the boss to the limit of its movement. In Figure 3 the elbow pipe has been turned so as to partially unthread its connection with the boss and so as to set the projecting portion 4 of the elbow pipe in a desired angular position relative to the tank to which the boss is fixed. After this elbow pipe has been set in its desired angular position, then the lock nut 17 is turned into contact with the boss and this will lock the elbow pipe in its set position. It is noted that there is a smooth metal to metal contact between the nut and the boss.

From the above it will be noted that the smooth surface 9 and the smooth surface 14 on the pipe 1 are concentric with the axis of the pipe. The smooth surface 14 makes a close fit with the smooth surface 6 on the boss and this will ensure that the width of the gasket recess will be uniform all the way around the pipe and therefore the expansion of the gasket will make a tight seal at all points.

I claim:

1. An elbow pipe coupling comprising a boss having a bore provided with a smooth section at its outer end and a threaded section extending inwardly from said smooth section, an elbow pipe having threaded connection with said boss, said pipe having a smooth section opposed to and spaced from said smooth section of the bore to provide a sealing chamber for a ring gasket, a nut threaded onto said pipe and adapted to directly engage the end of the boss for locking the elbow in a set angled position, said coupling being shaped so as to provide a smooth wall disposed at right angles to the longitudinal axis of the boss and extending from the smooth wall on the pipe to the smooth wall on the boss for closing said sealing chamber for all set angular positions of the elbow and a ring gasket in said sealing chamber dimensioned so as to make sealing contact by expansion with the opposed walls of the bore and the pipe.

2. An elbow pipe coupling comprising a boss having a bore provided with a smooth section at its outer end and a threaded section extending inwardly from said smooth section, an elbow pipe having threaded connection with said boss said pipe having a smooth section opposed to and spaced from said smooth section of the bore to provide a sealing chamber for a ring gasket, a nut threaded onto said pipe and adapted to directly engage the end of the boss for locking the elbow in a set angled position, said pipe having a smooth section disposed in a plane at right angles to the axis of the boss and extending from the first named smooth section on the pipe to the smooth section on the boss for closing the sealing chamber, said elbow pipe having a smooth cylindrical surface adapted to telescope into the boss and make sliding contact with the smooth wall on the boss for all angular set positions of the elbow, and a ring gasket in the sealing chamber, which ring gasket is so dimensioned as to contact solely by expansion with the opposed side walls of the sealing chamber.

3. An elbow pipe coupling comprising a boss having a bore provided with a smooth cylindrical section at its outer end concentric to the center of the bore and a threaded section extending inwardly from said smooth section, an elbow pipe having a threaded connection with said boss, said pipe having a smooth cylindrical section concentric to the center of the pipe and opposed to and spaced from the smooth section of the bore to provide a sealing chamber for a ring gasket, said pipe having a second smooth cylindrical surface concentric with the center of the pipe and dimensioned to engage within the bore and contact with the smooth surface at the outer end thereof and close said annular chamber and a ring gasket in said sealing chamber dimensioned so as to make sealing contact by expansion with the opposed walls of the bore and pipe.

4. An elbow pipe coupling comprising threadedly engaged boss and elbow pipe members, a ring gasket confined in a sealing chamber defined by opposed spaced smooth wall sections on the boss and the elbow pipe and a smooth end wall on the coupling disposed at right angles to the longitudinal axis of the boss and extending from the smooth wall on the elbow pipe to the smooth wall on the boss, said end wall operating to close said sealing chamber for all set angular positions of the elbow pipe and a nut threaded onto said elbow pipe and adapted to directly engage the end of the boss for locking the elbow pipe in a set angular position, said ring gasket being dimensioned so as to make sealing contact by expansion with the opposed walls of the bore and the elbow pipe.

WALTER MAKY.